June 27, 1967 C. D. KISSINGER 3,327,584
FIBER OPTIC PROXIMITY PROBE
Filed Sept. 9, 1963 7 Sheets-Sheet 1
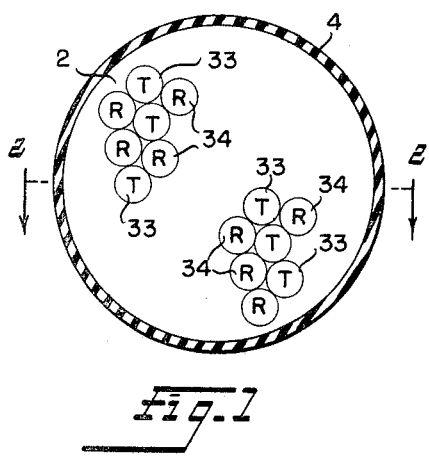
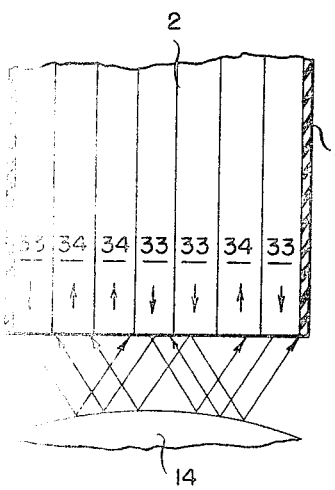
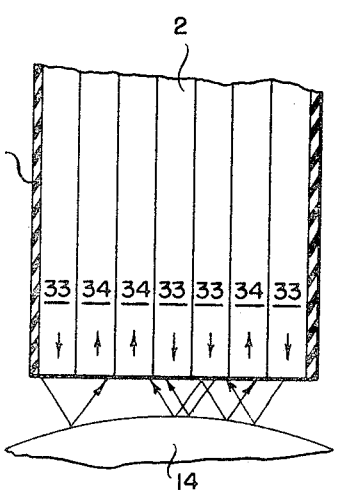
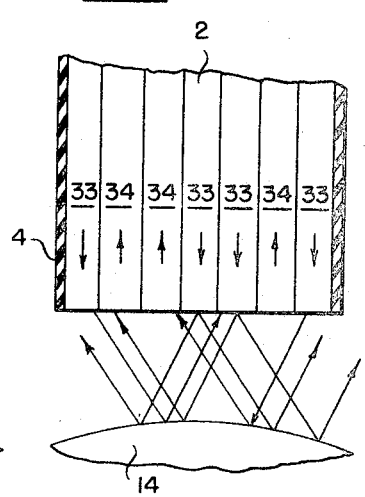
INVENTOR
*Curtis D. Kissinger*
BY Shlesinger, Shlesinger & Arkwright
ATTORNEYS June 27, 1967 C. D. KISSINGER 3,327,584
FIBER OPTIC PROXIMITY PROBE
Filed Sept. 9, 1963 7 Sheets-Sheet 2
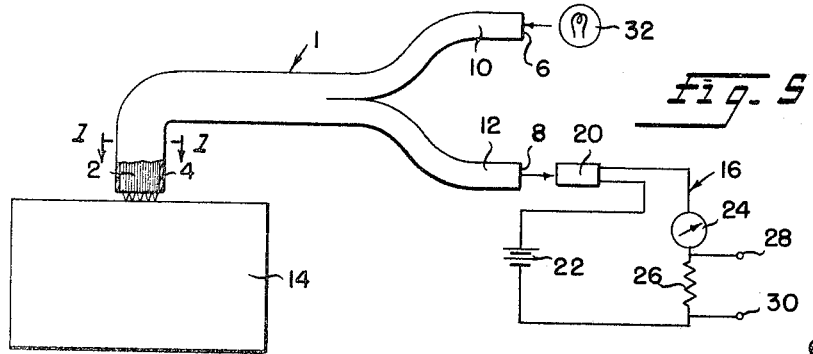
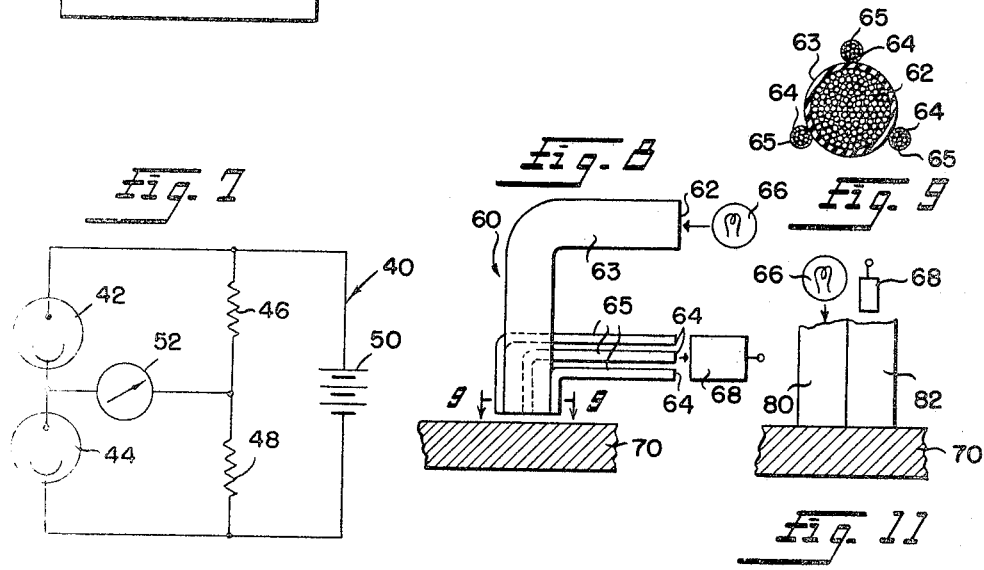
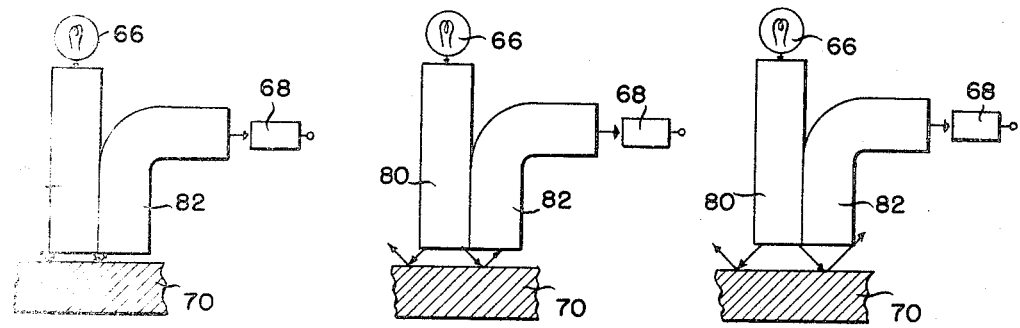
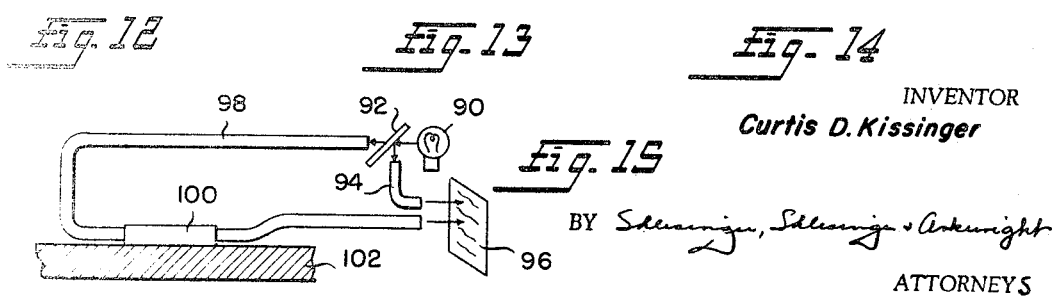
INVENTOR
Curtis D. Kissinger
BY Schlesinger, Schlesinger & Arkwright
ATTORNEYS

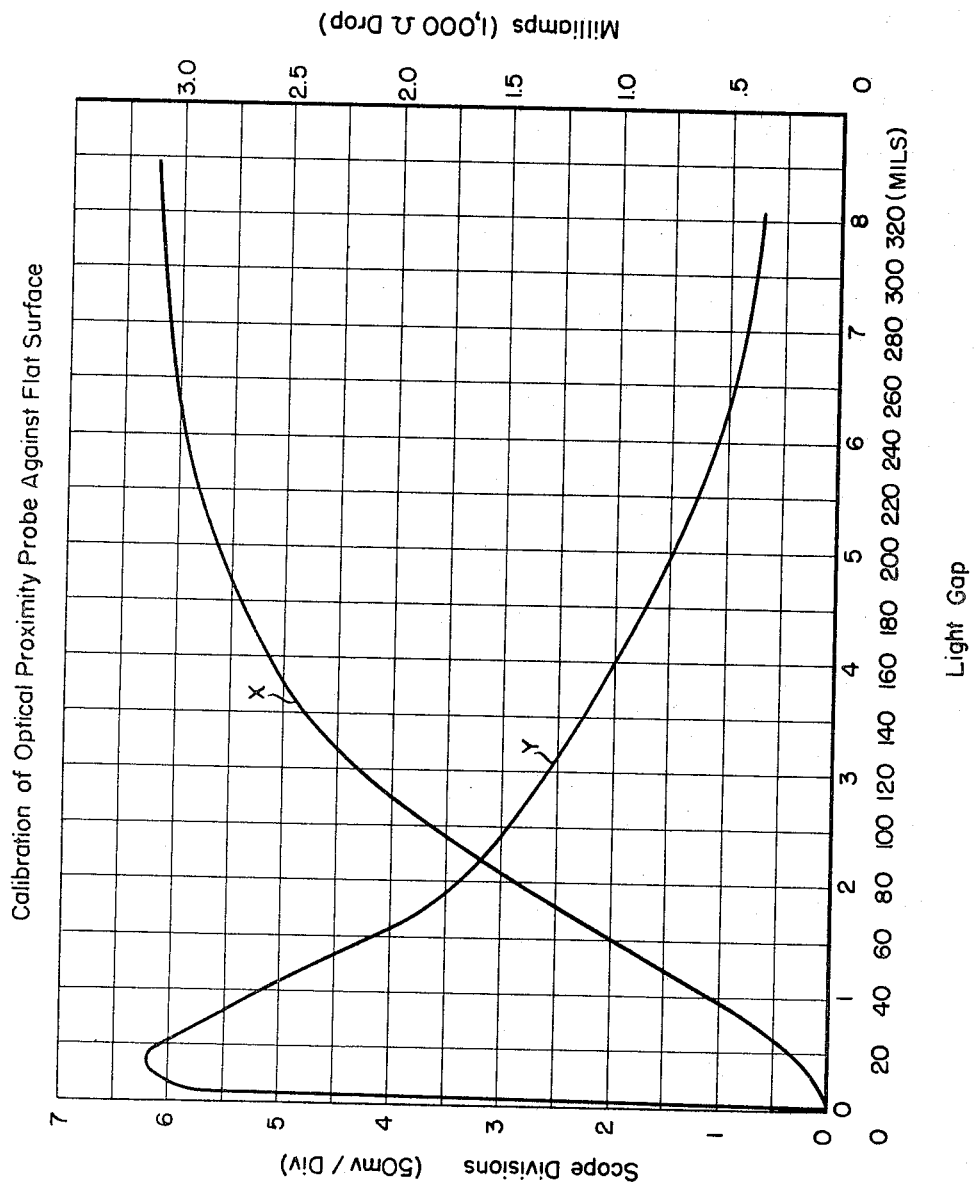

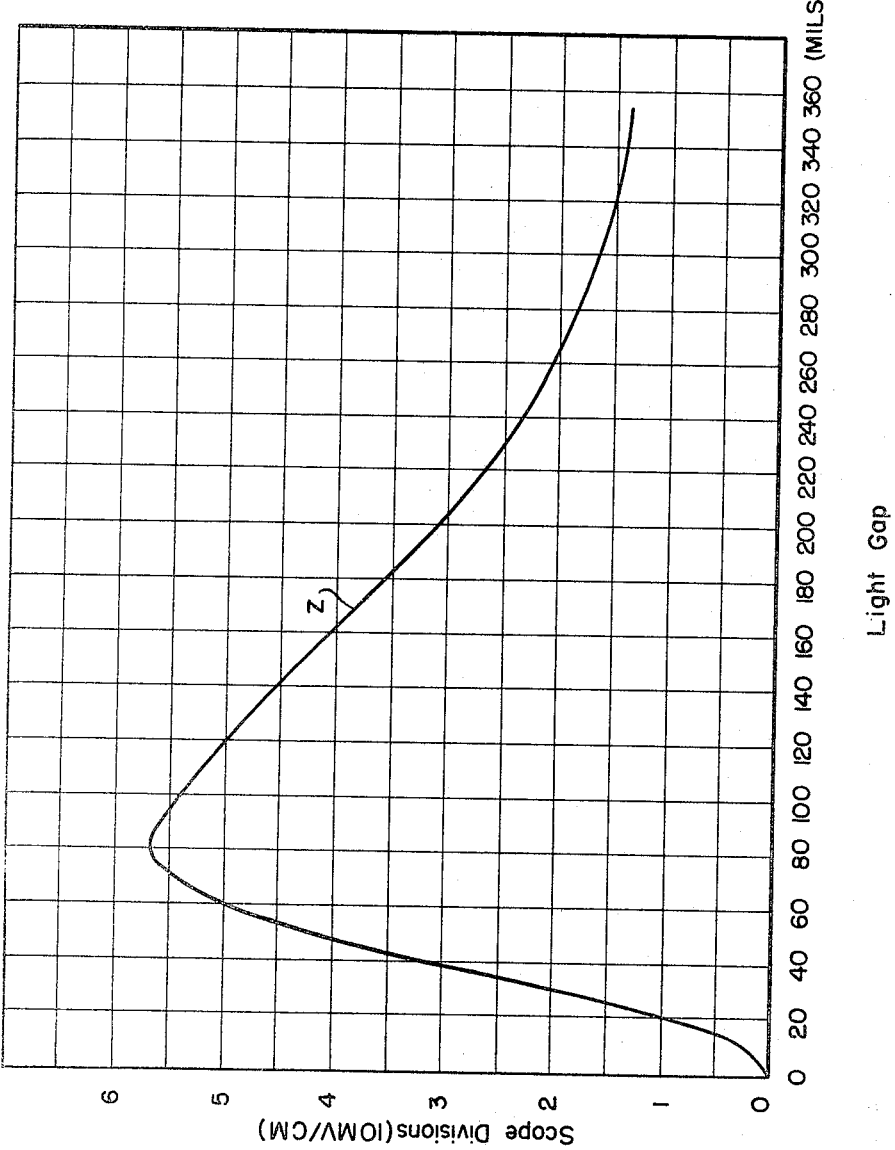

June 27, 1967 C. D. KISSINGER 3,327,584
FIBER OPTIC PROXIMITY PROBE
Filed Sept. 9, 1963 7 Sheets-Sheet 5

INVENTOR
Curtis D. Kissinger

BY Slesinger, Slesinger, Arkwright
ATTORNEYS

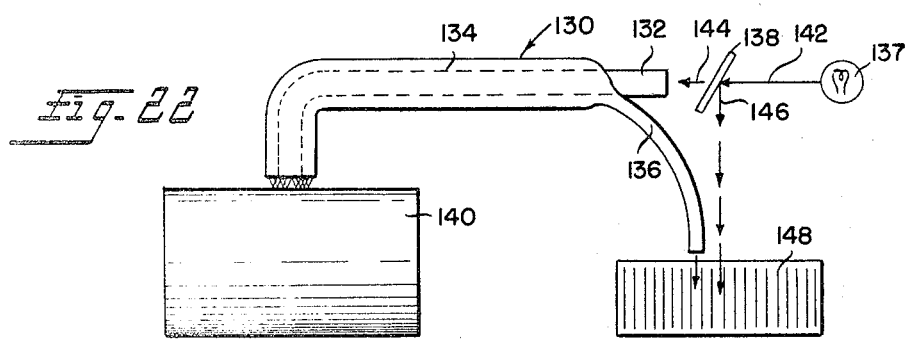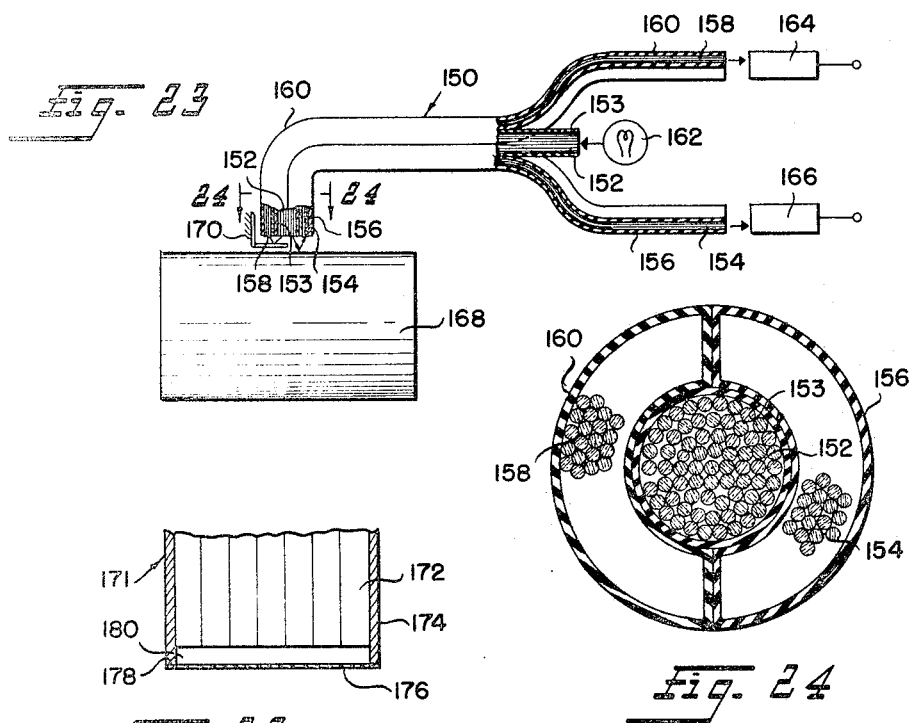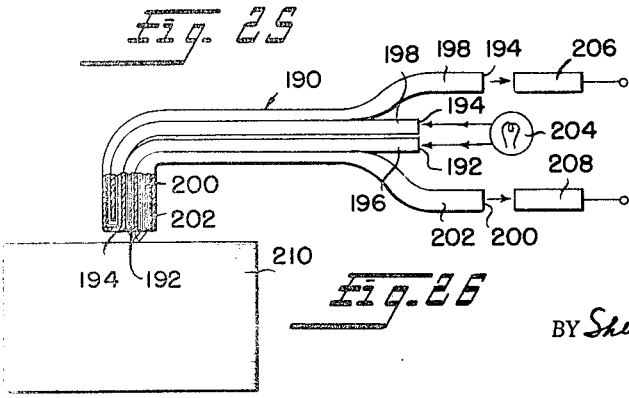

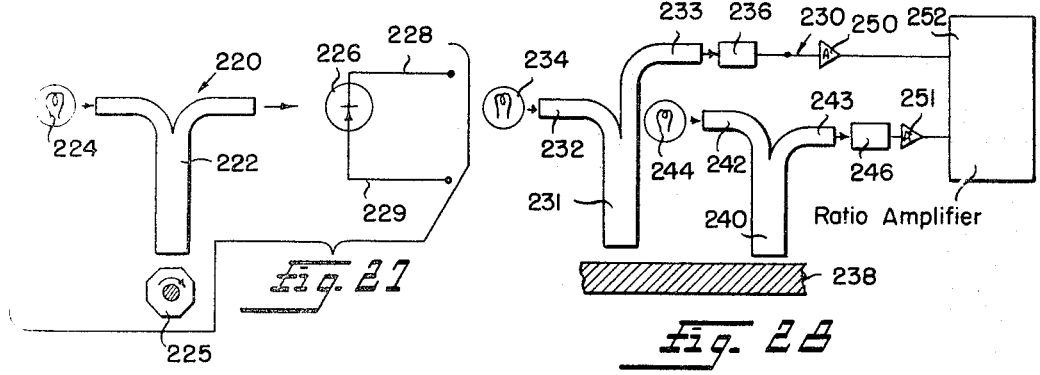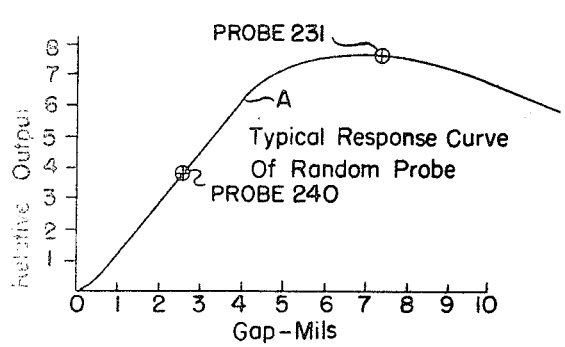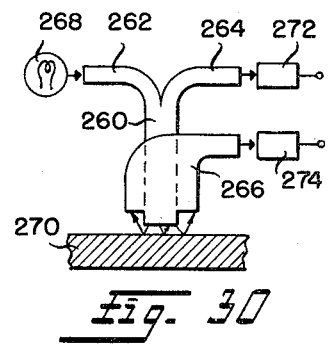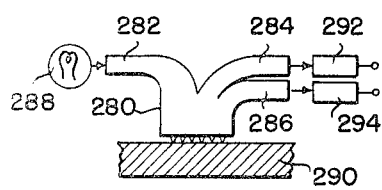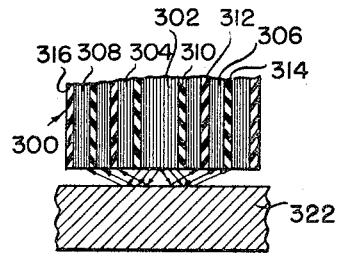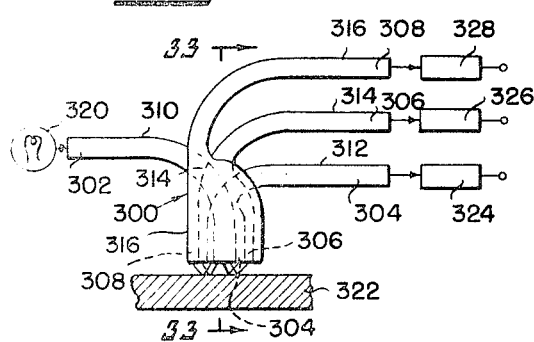

United States Patent Office 3,327,584
Patented June 27, 1967

3,327,584
FIBER OPTIC PROXIMITY PROBE
Curtis D. Kissinger, Gloversville, N.Y., assignor to Mechanical Technology Incorporated, Latham, N.Y., a corporation of New York
Filed Sept. 9, 1963, Ser. No. 307,676
5 Claims. (Cl. 88—14)

This invention relates to improvements in optical probes used in testing or measuring instruments as well as other optical devices using a light conducting medium. Heretofore, optical devices utilizing a light conducting medium have used glass, plexiglass, or Lucite for the light conducting medium however, probes of these types have not been sensitive and accurate enough for very fine measurements. It is a primary object of this invention to use probes utilizing optical fibers as the light conducting medium. By using optical fibers, it is possible to have a very small probe with each optical fiber as small as .0005 inch in diameter which permits extremely sensitive calibration and fine measurements.

The optical probe of this invention can be used in instruments to measure very minute shaft rotation, vibration or displacement, stress or strain, surface testing, and rotation counting.

Another important object of this invention is to utilize a light probe using random distribution or orientation of the individual fibers of the probe.

Another important object of this invention is to provide an optical probe which is highly sensitive and is not affected by physical environment or atmospheric problems such as high or low temperatures.

Still another object of this invention is to use a fiber optic probe as a digital transducer.

Also an object of this invention is to use a fiber optic probe for a timing device in ignition systems.

Yet another object of this invention is to use fiber optic probes for compensation of another fiber optic probe.

Still another object of this invention is to use a fiber optic probe utilizing a pressure sensitive device.

These and other objects of this invention will become apparent from a reading of the following specification and claims.

Figure 16:
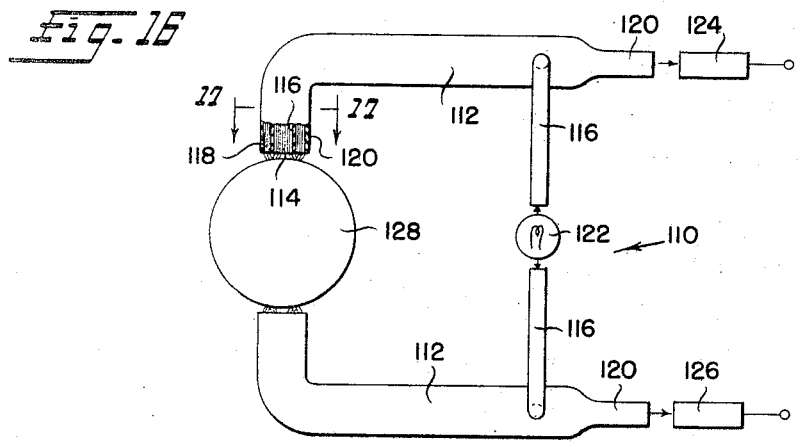
Figure 17:
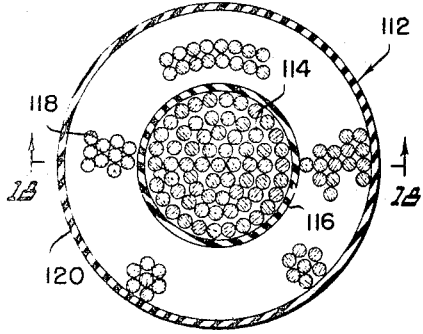

In the drawings:
FIGURE 1 is a view in section taken on line 1—1 of FIGURE 5 and looking in the direction of the arrows;
FIGURES 2–4 are fragmentaries in section taken on lines 2—2 of FIGURE 1 looking in the direction of the arrows and illustrating light reflection characteristics of the various optical fibers with the probe at various distances from a reflecting surface;
FIGURE 5 is a side view partially in section of another form of the invention;
FIGURE 6 is a graph illustrating characteristic curves of the probe shown in FIGURE 5;
FIGURE 7 is a light sensitive circuit which could be used as the sensing means for the probes of this invention;
FIGURE 8 is a side view of another form of the invention;
FIGURE 9 is a view in section taken on lines 9—9 of FIGURE 8 and looking in the direction of the arrows;
FIGURE 10 is a graph showing a characteristic curve of the probe of FIGURE 9;
FIGURES 11–14 are side views illustrating reflection characteristics of individual optical fibers;
FIGURE 15 is a side view showing another form of the invention;
FIGURE 16 is a side view partially in section of one form of the probe of this invention;
FIGURE 17 is a view in section taken on lines 17—17 of FIGURE 16 and looking in the direction of the arrows;
FIGURES 18–21 are fragmentaries in section taken on line 18—18 of FIGURE 17 looking in the direction of the arrows, and illustrating light reflection characteristics with the probe at various distances from a reflecting surface;
FIGURE 22 is a side view of another form of the invention;
FIGURE 23 is a side view partially in section of another form of the invention;
FIGURE 24 is a view in section taken on lines 24—24 of FIGURE 23 and looking in the direction of the arrows;
FIGURE 25 is a side view partially in section of another form of the invention;
FIGURE 26 is a side view partially in section of another form of the invention;
FIGURE 27 is a side view illustrating another form of the invention;
FIGURE 28 is a side view of a modified form of the invention;
FIGURE 29 is a graph illustrating the characteristics of the probes of FIGURE 28;
FIGURE 30 is a side view of another modified form of the invention;
FIGURE 31 is a side view of another form of the invention;
FIGURE 32 is a side view of another form of the invention;
FIGURE 33 is a fragmentary partially in section taken on lines 33—33 of FIGURE 32 and looking in the direction of the arrows.

FIGURES 1–5

FIGURE 5 shows an optical fiber probe 1 including a fiber optic light conducting medium 2 and having a light shielding cover member 4 covering a portion thereof. The fibers of light conducting medium 2 are divided at one end into two groups having approximately the same number of fibers in each group of substantially equal diameters. These two groups compose light conducting medium 6 and light conducting medium 8. Light shielding cover members 10 and 12 cover a portion of the light conducting medium 6 and 8, respectively. The fibers in each light conducting medium are selected randomly regardless of the orientation of the ends of the fibers nearest a test object 14.

The form of the invention shown in FIGURE 5 includes the test object 14 having a reflective surface, and a light sensing circuit 16 having an electrical output means.

Light sensing circuit 16 includes a light detector 20, a power source 22, an ammeter 24, a ballast resistor 26, and leads 28 and 30 which may be connected to an oscilloscope.

More than one group of fibers 8 may be used with each having an additional detector 20.

Probe 1 also includes a light source 32.

Light emitting from light source 32 is transmitted by randomly selected and randomly oriented light conducting medium 6 to test object 14 and is reflected into randomly selected and randomly oriented light conducting medium 8 to light detector 20.

The amount of reflected light received by detector 20 is a function of the gap distance as will be explained later in the specification.

FIGURES 2–4 illustrate reflection characteristics of the probe 1. With randomly distributed fibers, fibers 33 transmit light from light source 32 to test object 14, and fibers 34 receive reflected light from test object 14 and transmit the reflected light to detector 20. The position of the transmitting and receiving fibers 33 and 34 as shown in FIGURES 1–4 are only given as an example to show the random distribution of the fibers. No regard need be given to the position of either fibers 33 or fibers 34 in the probe.

FIGURE 1 shows the end sections of fibers 33 having a T thereon to indicate that these are transmitting fibers and the fibers 34 have an R on the end thereof to indicate receiving fibers.

Light emitted from any of the light transmitting fibers 33 may be reflected and received by one or more of the receiving fibers 34. The amount of reflected light received by fibers 34 will depend on the distance between the probe and the test object. FIGURES 2–4 show examples of the characteristics of the reflected light with respect to a gap distance. FIGURE 2 shows the probe positioned at a distance from the test object 14 to give a maximum amount of reflected light to be received by the fibers 34. FIGURE 3 shows the gap distance at a distance less than that of FIGURE 2.

FIGURE 4 shows the gap distance to be greater than that of FIGURE 2 and shows a portion of the reflected light beams not being received by the receiving fibers 34.

FIGURE 6

FIGURE 6 is a graph illustrating the current read on ammeter 24 and the trace shown on an oscilloscope as a result of the use of the probe with randomly selected fibers of FIGURE 5. The graph shows the characteristic curves with the probe 1 at various gap distances from test object 14.

The graph of FIGURE 6 shows that by having the gap distance between approximately 1–3 mils, the response of the probe to reflected light received is substantially linear within this given range as indicated in the graph by curve X. Curve X indicates the response of the probe over a gap of 0 to 8 mils. Curve Y indicates the response of the probe over a gap of 0 to 320 mils.

FIGURE 7

FIGURE 7 shows an example of a light detector bridge circuit 40 having an electrical output means which could be used in the forms of the invention utilizing a reference signal. Circuit 40 includes light detectors 42 and 44, fixed resistances 46 and 48, a power source 50, and an ammeter 52. This is only an example of a circuit that could be used in this invention, therefore, various other suitable circuits could be utilized.

FIGURE 8

FIGURE 8 shows an optical fiber probe 60 including an optical fiber light conducting medium 62 having a light shielding cover member 63 covering a portion thereof. Around the light conducting medium 62 are randomly spaced three optical fiber light conducting mediums 64 each having a light shielding cover member 65 covering a portion thereof. Probe 60 also includes a light source 66, a light detector 68 having an electrical output means, and a test object 70 having a reflective surface. The diameters of the light conducting mediums 64 are smaller than the diameter of light conducting medium 62.

Light emitting from light source 66 is transmitted through light conducting medium 62 and is reflected from test object 70 to one or more of the light conducting mediums 64 to a light detector 68. Only three light conducting mediums 64 and only one light detector 68 are shown, but more than the number shown may be used if desired with a detector for each medium 64 or one detector for all of the mediums 64.

FIGURE 10

FIGURE 10 shows the characteristic curve of the detected light for the probe 60 of FIGURE 8 with the gap distance between the probe 60 and the test object 70 at various distances. A similar circuit to that shown in FIGURE 5 could be used with the probe 60 of FIGURE 8.

The graph of FIGURE 10 shows a curve Z indicating the response of the probe of FIGURE 8 as read out on an oscilloscope at various gap distances. It can be readily seen that the response of the probe to reflected light is substantially linear with the gap distance between approximately 10–50 mils.

FIGURES 18–21 give some insight in regard to the characteristic curve of FIGURE 10 and the changes in the curve against various gap distances between the probe 112 and the test object.

FIGURES 11–14

In FIGURES 11–14 one transmitting light conducting medium optical fiber 80 and one receiving light conducting medium optical fiber 82 are shown to illustrate the reflection characteristics of the probe 1 with respect to the test object 14 of FIGURE 5. FIGURE 11 shows no light being reflected from the transmitting light conducting medium fiber 80 to the receiving light conducting medium fiber 82. FIGURE 12 shows light reflected from the test object 70 back to fibers 82 and FIGURE 13 shows the same arrangement with the reflecting light and covering approximately half of fiber 82. FIGURE 13 shows the fibers at a greater distance away from the test object 70 and this figure shows the reflected light beam covering the entire end of fiber 82. FIGURE 14 shows an increase in the gap between the fibers and the reflecting surface of test object 70. In FIGURE 14, the reflected light is shown to reflect beyond the end of fiber 82. With the use of the probe 1 shown in FIGURES 1–4, the sensitivity is limited to the gap between the probe and the test object.

FIGURE 15

FIGURE 15 shows a strain gauge testing device utilizing optical fibers wherein light transmitted from a monochromatic light source 90 is split or divided by half mirror 92. The reflected light from half mirror 92 is transmitted through a first optical fiber light conducting medium 94 to an optical flat or light receiving means 96. The other half of the light beam transmitted from light source 90 is transmitted through a second optic fiber light conducting medium 98 to the optical flat or light receiving means 96. A portion 100 of the second light conducting medium 98 is attached to a surface 102. Any stress or strain on surface 102 will effect the light transmitted through light conducting medium 98, and the affected light beam will be projected onto the optical flat 96. A comparison can be made visually of the affected light beam and the standard light beam from light conducting medium 94. A high speed electrical readout system may be used with this system by converting the sensed light beams into a electrical DC output by the use of suitable light detectors. The light beams from light conducting medium 94 and 98 produce fringe patterns similar to the patterns as will be discussed for FIGURE 22.

FIGURE 16

FIGURE 16 shows an optical probe testing system 110 including two optical probes 112. Each optical probe 112 includes a first fiber optic light conducting medium 114 having a light shielding cover member 116. Surrounding a portion of the light shielding cover member 116 is a second fiber optic light conducting medium 118. Covering at least a portion of the second light conducting medium is a light shielding cover member 120. The system 110 includes a light source 122 and light detectors 124 and 126. The object being tested is shown to be a rotating shaft 128. Other light reflecting surfaces other than a rotating shaft could be tested with this system.

The light detectors 124 and 126 could be photocells or photoresistive detectors, such as cadmium sulfide photocells for converting light into electrical indications.

The system shown in FIGURE 16 includes two optical probes 112. One optical probe could be used for testing purposes, or a plurality of optical probes 112 could be used in a system such as this.

Suitable electronic circuits may receive the output of detectors 124 and 126 and compare the two outputs for analysis purposes.

The light conducting mediums 114 and 118 show a plurality of glass fibers. As many or as few glass fibers as desired could be used in this system. As pointed out in the objects to this invention, the diameter of the optical fiber used in this invention is in the area of .0005 inch.

The light shielding cover members 116 and 120 could be made of a metallic or non-metallic material and could have some degree of flexibility.

FIGURES 18–21

Figure 19:
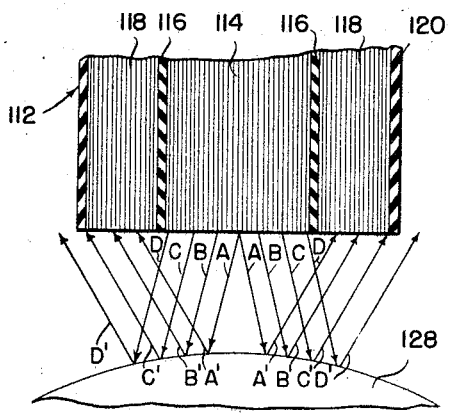
Figure 18:
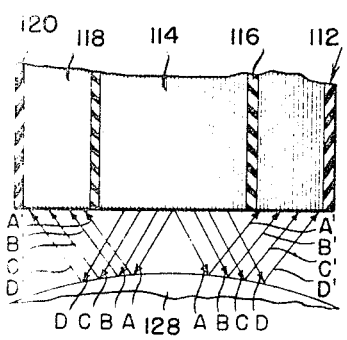
Figure 20:
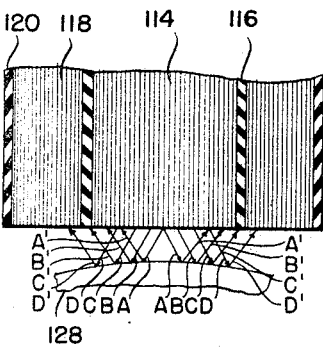

FIGURES 18–21 illustrate reflection characteristics of the probe 112. For illustration purposes only the FIGURES 18–20 show transmitted light beams A, B, C, and D. The reflected light waves from test object 128 are illustrated as reflected waves A', B', C', and D'. FIGURE 18 shows maximum sensitivity with the probe 112 at a distance from the test object 128 wherein the transmitted light waves A–D from light conducting medium 114 are reflected as reflected light waves A'–D' and are received by light conducting medium 118.

FIGURE 19 shows the probe 112 having less sensitivity, wherein reflected light beams A'–C' are received by the the light conducting medium 118 and the reflected light beam D' is not received. The probe 112 is decreased in its sensitivity by either the test object 128 being farther away from the test probe 112, or having moved the probe 112 away from the test object 128.

FIGURE 20 shows the light conducting medium 114 receiving reflected light beams A'–C' and having reflected light beam D' reflecting back into the light conducting medium 118. In this illustration the probe 112 is closer to the test object 128 than is shown to be in FIGURE 18.

Figure 21:
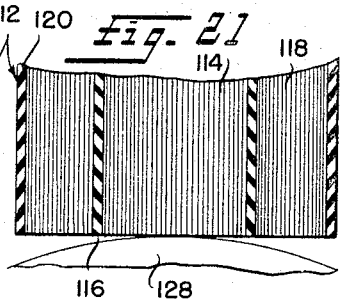

FIGURE 21 shows the probe 112 abutting or in close proximity to the test object 128. In this illustration, all of the reflected light beams are reflected into the light conducting medium 114 (the reflected beams not shown).

From the discussion of the light reflection characteristics at various gap distances between the probe 112 and test object 128 it will be seen that a given gap distance can be determined, as shown in FIGURE 18 for a maximum amount of reflected light, thereby providing a maximum or given electrical output from the light detector. Therefore, if the test object 128 is at a distance greater or less than the given gap distance, the amount of reflected light received by the light detector varies thereby varying the electrical output of the light detector and therefore gives an indication of a change in gap distance.

The optical probe testing system of FIGURE 16 shows the light source 122 being used as a common light source for the two probes 112 shown. The light source 122 could be used for a plurality of probes or an individual light source could be used for each probe. The light detectors 124 and 126 may be connected to suitable electronic circuits to provide an electrical output means for analyzing purposes.

FIGURE 22

The form of the invention shown in FIGURE 22 utilizes an optical probe 130 similar to the optical probes 112 of FIGURE 16. The optical probe 130 includes a shielded fiber optic light conducting medium 132 and a concentric shielded fiber optic light conducting medium 134. The concentric light conducting medium 134 terminates in a shielded light conducting medium 136. The probe shown in FIGURE 22 includes a monochromatic type light source 137 and a half silvered mirror 138. The test object 140 may be a rotating shaft or any other reflective surface. The light beam 142 from light source 137 is split or divided into a transmitted light beam 144 and a reflected light beam 146. The reflected light beam 146 is projected onto an optical flat or light receiving means 148.

Transmitted light beam 144 is transmitted by light conducting medium 132 to test object 140. Reflected light from test object 140 is received by light conducting medium 134 and transmitted to optical flat 148. The fringe pattern produced on flat 148 by the reflected light may be visually compared to the fringe pattern produced on flat 148 by beam 146 for analyzing purposes. The fringe pattern from light conducting medium 134 is a function of the gap distance between the light conducting medium 134 and the test object 140.

A high speed electrical readout system could be used with this system in place of the optical flat 148 by converting the sensed light beams into a DC output by the use of suitable light detectors.

FIGURE 23

FIGURE 23 shows an optical probe 150 including a first fiber optic light conducting medium 152 having a light shielding cover member 153, a second fiber optic light conducting medium 154 having a light shielding cover member 156, and a third fiber optic light conducting medium 158 having a light shielding cover member 160. Optical probe 150 also includes a light source 162 and light detectors 164 and 166. Light detectors 164 and 166 may lead to suitable electronic circuits.

The light conducting mediums 154 and 158 with their cover members 156 and 160 encircle or surround a portion of light conducting medium 152 (best shown in FIGURE 24).

A test object 168 having a reflective surface thereon is the object to be tested in this form of the invention. The test object 168 may be any suitable object under test. Included in this form of the invention is a reflective surface 170. Reflective surface 170 may be mounted by any suitable means and is adjustable with respect to the distance of the gap between the end of the probe and itself.

Light beams emitted from light source 162 are transmitted through the first light conducting medium 152, and a portion of the transmitted light beams are reflected from the test object 168 back through the second light conducting medium 154 to light detector 166. Another portion of the transmitted light beam is reflected from reflective surface 170 back through the third light conducting medium 158 to light detector 164. The reflective surface 170, the light conducting medium 158 and light detector 164 are used as a reference or standard to the variable reflected light beam from the test object 168. The reference or standard may be changed by adjusting the reflective surface 170 with respect to its distance from the end of probe 150. Reflective surface 170 may have a portion thereof extending across the face of probe 150 to a point intersecting all of light conducting medium 158 and substantially half of light conducting medium 152.

Light detectors 164 and 166 may lead to suitable electronic circuits such as bridge arrangement to provide electrical output means.

With the use of a reference or standard such as shown in FIGURE 23, a control means is provided for the compensation of the affects of probe growth at high temperatures or possible movement of the fiber mediums.

FIGURE 25

FIGURE 25 shows a further modification of the fiber optic probes of this application. Fiber optic probe 171 includes a light conducting medium 172, a light shielding cover member 174, and a pressure sensitive diaphragm 176. The light conducting medium 172 of this modification is shown to be of the randomly oriented fiber type as described for FIGURE 5. The concentric arrangement of the light conducting mediums as described for FIGURE 16 could also be used in this modification.

Cover member 174 should be made of any suitable rigid material. Diaphragm 176 may be connected at 178 to member 174 by any suitable means. A space 180 is provided between the end of light conducting medium 172 and diaphragm member 176.

A suitable light source and light detector circuit may be utilized with this modification, using the light sources and detectors as previously described.

The interior surface of diaphragm member 176 should have a reflective surface therewith. As the diaphragm is flexed toward light conducting medium 172, the gap distance between the light conducting medium and the diaphragm member 176 is varied therefore varying the amount of reflected light to be received by a portion of the light conducting medium. The electrical output of the light detector would vary with respect to the amount of reflected light received by various fibers of the light conducting medium 172. Probe 171 could be utilized for any testing purpose wherein a pressure external of diaphragm member 176 would react on the diaphragm. The varying of the gap distance would vary the amount of reflected light receiving by the light detector similar to that described for FIGURES 5 and 16.

FIGURE 26

FIGURE 26 shows a modification of the reference signal probe that is shown in FIGURE 23. Optical fiber probe 190 includes a first fiber optic light conducting medium 192 and a second fiber optic light conducting medium 194. Each light conducting medium has a light shielding cover member 196 and 198, respectively. Probe 190 also includes a third fiber optic light conducting medium 200 having a light shielding cover member 202.

Light conducting medium 194 extends along the entire length of light conducting medium 192 and extends back in its length the length of light conducting medium 200.

Probe 190 also includes a light source 204, light detectors 206 and 208, and a test object 210.

A portion of the light emitted from light source 204 is transmitted through light conducting medium 192, reflected from test object 210, and transmitted back through light conducting medium 200 to a light detector 208. Another portion of the light from light source 204 is transmitted through light conducting medium 194 to light detector 206. The purpose of this form of the invention is to provide a reference signal through light conducting medium 194 which will be exposed to the same external conditions as the light beam transmitted through the light conducting medium 192 and the reflected light beam transmitted through the light conducting medium 200, except that the reference light beam does not reflect from any object or traverse a gap.

Suitable electronic circuits may be provided for detectors 206 and 208 to provide electrical output means.

The light conducting mediums 192, 194 and 200 may be encased or bundled together by a suitable wrapper or covering (not shown) or bundled together by any suitable means.

FIGURE 27

FIGURE 27 shows the use of a fiber optic light probe in an ignition system such as are used in automobiles. The ignition system 220 includes an optical fiber light conducting probe 222, a light source 224, a rotatable reflecting rotor 225, and a light sensitive solid state switch 226. The leads 228 and 229 from the solid state switch 226 may lead to a transistorized ignition or to the primary of the coil. The rotor 225 may take the place of the distributor cam of conventional ignition systems.

Light emitted from the light source 224 is transmitted through probe 222 to the rotor 225, and the reflected light is received by the probe 222 and is transmitted to the switch 226 whereby a pulse is triggered to the ignition system. The probes discussed in FIGURES 5 and 16 could be utilized for this system.

By using a fiber optic probe in the system shown in FIGURE 27, the normal breaker points of an ignition system may be eliminated, and the life of the ignition system may be extended.

It is also pointed out that the light output sensed by switch 226 is a function of the gap between the end of the probe 222 and the rotor 225 and thereby the switching on and off of switch 226 is independent of the rotational speed of the rotor. The use of an optical probe system for ignition systems would also permit the light source 224 and the switch 226 to be positioned remote of the engine and therefore isolate them from vibration and high or low temperatures.

FIGURE 28

FIGURE 28 shows another modification of this invention wherein a measuring system 230 includes a first optical fiber probe 231. Probe 231 includes a fiber optic light conducting medium which is split or divided at 232 into a transmitting fiber optic light conducting medium portion or group and at 233 into a receiving fiber optic light conducting medium portion or group. In conjunction with probe 231 is a light source 234, a light detector 236 and a test object 238 having a reflective surface. Also included in measuring system 230 is a second optical fiber probe 240 including a transmitting fiber optic light conducting medium 242 and a receiving fiber optic light conducting medium 243. Probe 240 also has a light source 244 and a light detector 246. The probes used in the system 230 may be the randomly selected and randomly oriented type probe shown in FIGURE 5 or the concentric probe type shown in FIGURE 16. More than one group of fibers 233 or 243 may be used with each group having a light detector associated therewith. The groups of each probe have substantially equal diameters.

Probe 231 is positioned so as to have a greater gap between the probe and the test object 238 than the gap between probe 240 and the test object 238.

The light beam detected by light detector 236 is converted to an electrical output and is fed to an amplifier 250 and the light detected by light detector 246 is converted to an electrical output and is amplified by amplifier 251. The outputs of amplifiers 250 and 251 are fed to a ratio amplifier 252. The output of amplifier 252 may be applied to a suitable meter or oscilloscope for analysis.

FIGURE 29

By using the system 230 shown in FIGURE 28, the resulting graph of FIGURE 29 was obtained. By using an additional group of fibers or an additional probe set at a proper gap to be sensing in a position to obtain a peak output, it is possible to have a system which is not sensitive to gap changes but is sensitive to reflectivity changes.

It can be seen from the curve A, that probe 240 is positioned in the approximate center of the linear portion of the response curve A. Probe 240 therefore is at a gap distance to receive maximum reflected light. Probe 231 is shown to be at a greater gap distance and not receiving maximum reflected light.

Only two probes are shown in the system of FIGURE 28, but a plurality of probes could be utilized, or a plurality of systems as is shown in FIGURE 28 could be utilized.

FIGURE 30

FIGURE 30 shows a probe 260 which could be used in place of the probes shown in FIGURE 28, but utilizing the electrical arrangement for FIGURE 28.

Optical fiber light conducting medium probe 260 includes a transmitting fiber optic light conducting medium portion 262 and a receiving fiber optic light conducting medium portion 264. Around a portion of the optical fiber probe 260 is a concentric fiber optic light conducting medium 266. The probe 260 also includes a light source 268 and a test object 270 with a reflective surface. A light detector 272 detects light transmitted through light conducting medium 264 and a light detector 274 detects light transmitted through light conducting medium 266. Light conducting medium 266 has one end thereof positioned a predetermined distance away from test object 270 at a distance greater than the gap between probe 260 and the test object 270. With the probe shown in FIGURE 30, light is emitted from light source 268 through light conducting medium 262 and is reflected off of test object 270. Reflected light is received by probe 260 and transmitted to detector 272 through light conducting medium 264. Also a portion of the reflected light is received by light conducting medium 266 and transmitted to light detector 274. The electrical signals from detectors 272 and 274 may be applied to an amplifier system such as is shown in FIGURE 28. Portions 262 and 264 have substantially equal diameters.

Probe 260 may be of the randomly distributed optical fiber type shown in FIGURE 5 or the concentric arrangement shown in FIGURE 16. The random distribution of the fibers is more desirable in this modification.

FIGURE 31

The probe 280, shown in FIGURE 31 may also be used in the system of FIGURE 28. Light conducting medium probe 280 is of the randomly oriented optical fiber type, similar to the probe disclosed for FIGURE 5. Probe 280 includes a transmitting optical fiber light conducting medium portion 282, a first receiving optical fiber light conducting medium portion 284 and a second optical fiber light receiving conducting medium portion 286. Light conducting mediums 282 and 284 have substantially equal diameters, whereas light conducting medium 286 is of less diameter than light conducting mediums 282 and 284 though shown distorted in FIGURE 31. Included with the use of this probe is a light source 288, a test object 290, a light detector 292 for sensing light transmitted through light conducting medium 284 and a light detector 294 for detecting light transmitted through light conducting medium 286. The electrical outputs of detectors 292 and 294 could be applied to the electrical amplifier system shown in FIGURE 28. With the use of probe 280, the light detected by the random distribution of the fibers of light conducting medium 286 would sense maximum light reflection before the larger group of fibers in light conducting medium 284 would reach a maximum detection of reflected light. Also by utilizing probe 280, the probe would compensate for output changes due to spectral response of the light detectors when the probe is testing a hot surface that may give out light beams other than the reflected light beams from the light source 288.

FIGURE 32

The probe shown in FIGURE 32 is another modification of the probe which could be utilized in the system shown in FIGURE 28. Optical fiber probe 300 includes a transmitting fiber optic light conducting medium 302, a first concentric receiving fiber optic light conducting medium 304 surrounding a portion of light conducting medium 302, a second concentric receiving fiber optic light conducting medium 306 surrounding a portion of light conducting medium 304, a third concentric receiving fiber optic light conducting medium 308 surrounding a portion of light conducting medium 306, and having a light shielding cover member 310 between light conducting medium 302 and 304, a light shielding cover member 312 between light conducting medium 304 and 306, a light shielding cover member 314 between light conducting medium 306 and 308, and a light shielding cover member 316 surrounding a portion of light conducting medium 308. Included with this probe is a light source 320 and a test object 322 having a reflective surface.

Included with this probe is also a group of light detectors 324, 326, and 328.

At a given gap between probe 300 and test object 322, light is emitted from light source 320 through light conducting medium 302 and is reflected from test object 322. At this given gap distance, the reflected light is received by light conducting mediums 304, 306 and 308. As the gap is varied, the amount of reflected light received by the light conducting mediums 304, 306, and 308 is varied. At a given gap distance, one of the receiving light conducting mediums will be receiving a greater amount of reflected light than the other receiving light conducting mediums. With the reflected light being transmitted to detectors 324–328, and the electrical output of the light detectors being fed to a system similar to the system shown in FIGURE 28, a compensated output may be obtained. Also the detectors 324–328 could be connected to a trigger type circuit so that the detectors may be considered on or off. In a trigger type arrangement, as the gap increased, the reflected light would grow larger and thereby trigger successive rings of fibers. The detectors could be fed to a suitable digital readout type electronic circuit. With the use of the concentric arrangement of FIGURE 32, the method of triggering the detectors would be a function of the gap size and the fiber diameter rather than a function of the amount of the reflected light beams.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. A proximity detector for sensing the relative position of a test object comprising a probe, said probe including a plurality of light transmitting fibers, said fibers being divided into two groups, the first group constituting light transmitting fibers and the second group constituting light receiving fibers, a light source associated with the light transmitting fibers, the fibers of both groups terminating in a uniform surface at the probe adapted to face the test object, a light detector having a signal output associated with the light receiving fibers so that the light transmitted from the light source through the light transmitting fibers is directed to the test object and is reflected back from the test object and passes through the light receiving fibers and is sensed by the light detector to generate a signal, a second group of light receiving fibers, a second light detector being operatively associated with the second group of light receiving fibers, the second group of light receiving fibers being spaced from the test object to pass reflected light from the test object to the second light detector, and means for translating the signal from the light detectors to indicia indicating the distance between the probe and the test object.

2. The proximity detector according to claim 1 further comprising means for passing light from at least a portion of the light transmitting fibers to the second group of light receiving fibers whereby the second light detector provides a reference signal for comparison with the light signal detected by the first-mentioned light detector.

3. The proximity detector according to claim 1 wherein the fibers in the first and second light receiving groups respectively are of different diameters in order to compensate for variations in reflection characteristics of the test object.

4. The proximity detector according to claim 1 wherein the ends of the fibers in the first and second light receiving groups respectively are spaced different distances from the test object in order to compensate for variations in reflection characteristics of the test object.

5. The proximity detector according to claim 1 wherein the first and second light receiving groups of fibers, are located different distances from the end of the light transmitting means in order to compensate for variations in reflection characteristics of the test object.

References Cited
UNITED STATES PATENTS

| 2,256,595 | 9/1941 | Metcalf | 250—227 |
| 3,068,742 | 12/1962 | Hicks et al. | |
| 3,120,125 | 2/1964 | Vasel | 88—1 X |
| 3,215,135 | 11/1965 | Franke. | |
| 3,240,106 | 3/1966 | Hicks | 88—1 |
| 3,244,894 | 4/1966 | Steele et al. | 88—1 X |

OTHER REFERENCES

Dersh "Optical Switching Using Light Pipes" IBM Technical Disclosure Bulletin, vol. 5, No. 8, January 1963, pp. 97, 98.

JEWELL H. PEDERSEN, *Primary Examiner.*

JOHN K. CORBIN, *Examiner.*

UNITED STATES PATENT OFFICE
CERTIFICATE OF CORRECTION

Patent No. 3,327,584           Dated June 27, 1967

Inventor(s) Curtis D. Kissinger

It is certified that error appears in the above-identified patent and that said Letters Patent are hereby corrected as shown below:

Column 1, line 13, "plexiglass" should read -- plexiglas --.

Signed and sealed this 1st day of June 1971.

(SEAL)
Attest:

EDWARD M. FLETCHER, JR.
Attesting Officer

WILLIAM E. SCHUYLER, JR.
Commissioner of Patents